United States Patent [19]

Carpenter

[11] Patent Number: 4,674,698

[45] Date of Patent: Jun. 23, 1987

[54] LEFT-RIGHT RETRIEVE SPIN CAST REEL

[75] Inventor: Robert L. Carpenter, Tulsa, Okla.

[73] Assignee: Brunswick Corporation, Skokie, Ill.

[21] Appl. No.: 682,350

[22] Filed: Dec. 14, 1984

[51] Int. Cl.⁴ .................... A01K 89/01; A01K 89/02
[52] U.S. Cl. .................... 242/84.2 A; 242/84.5 A
[58] Field of Search .................... 242/84.2 R, 84.2 A,
    242/84.21 A, 84.21 R, 84.5 A, 84.51 A, 84.5 P

[56] References Cited

U.S. PATENT DOCUMENTS

| | | | |
|---|---|---|---|
| 2,988,298 | 6/1961 | Purnell | 242/84.53 |
| 3,411,230 | 11/1968 | Hopper | 242/84.2 A |
| 3,946,963 | 3/1976 | Oberg | 242/84.51 A |
| 4,332,358 | 6/1982 | Neufeld | 242/84.2 A |
| 4,408,729 | 10/1983 | Moss et al. | 242/84.2 A |
| 4,463,914 | 8/1984 | Puryear | 242/84.2 A |
| 4,524,923 | 6/1985 | Tunoda et al. | 242/84.5 A |

Primary Examiner—Billy S. Taylor
Attorney, Agent, or Firm—Wood, Dalton, Phillips, Mason & Rowe

[57] ABSTRACT

This invention relates to structure for converting a spin-cast style reel between left-hand and right-hand operation. A crank handle is selectively, threadably mounted at the ends of a crank shaft which has a face gear in mesh with a pinion gear on a center shaft associated with a spinner head assembly. The invention also contemplates the provision of separate drag actuators through which drag braking pressure can be applied, from either side of the reel, depending upon from which side the reel is operated. A still further aspect of the invention is the provision of a removable boss used to support one end portion of the crank shaft. The boss is slidably associated with the reel body. By removing the boss, placement and removal of the crank shaft with its associated gearing is facilitated.

5 Claims, 6 Drawing Figures

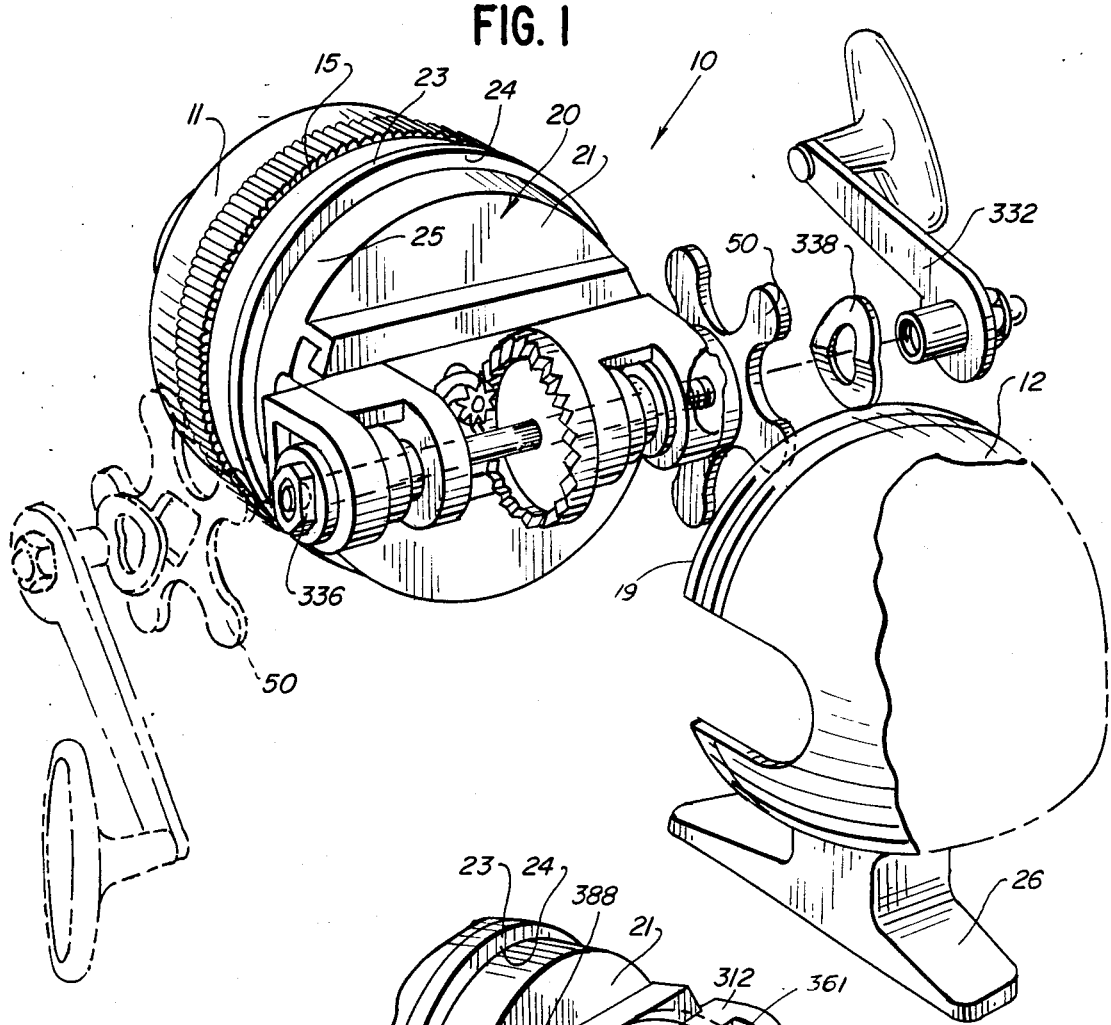
FIG. 1
FIG. 2
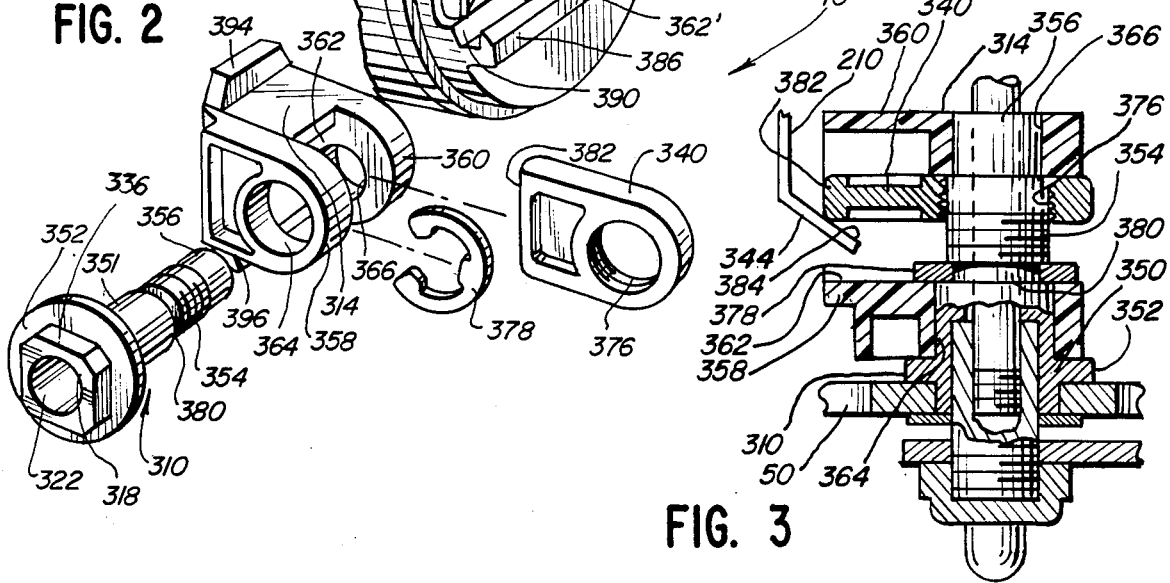
FIG. 3

LEFT-RIGHT RETRIEVE SPIN CAST REEL

BACKGROUND OF THE INVENTION

1. Field of the Invention

This invention relates to spin cast style fishing reels and, more particularly, to a reel that is convertible between the left-hand and right-hand operating modes.

2. Background Art

Conventional above-the-rod spin cast style fishing reels accommodate either left-handed or right-handed operators, depending on which side of the reel the crank handle is carried. The conventional above the rod spin cast construction therefore has had serious drawbacks from the standpoint of both manufacturing and distribution. Parts must be fabricated which are adaptable to the reels of only one operating mode. In stocking supplies of reels for sale, a distributor must attempt to anticipate the demand for reels operated by left and right-handed users.

It is known to make spinning reels that are convertible between left-hand and right-hand operation. An exemplary structure is shown in U.S. Pat. No. 4,196,867, to Miller. In Miller, the screw connected crank handle can be separated and reconnected on the opposite side of the reel. However, structurally the above the rod spin cast reel does not lend itself to incorporation of this structure. First of all the drag assembly in Miller is rear mounted and is not associated with the crank mechanism. Consequently, conversion between left-hand and right-hand operation modes in Miller does not require an adaptation of the drag mechanism as is required in the above the rod spin cast style reels.

Under-the-rod spin cast style reels such as shown in Neufeld U.S. Pat. No. 4,368,856 have an interchangeable left-right crank handle structure made possible in part because there is no star wheel drag adjustment coaxial with the crank shaft.

Further, the axis of the crank shaft in most above the rod spin cast reels normally intersects the center shaft axis. Extension of the crank shaft across the width of the reel to allow conversion is precluded because the crank shaft would interfere with the operation of the center shaft, directed rearwardly beyond the axis of the crank shaft for engagement by a rear mounted thumb button or the like.

The present invention is specifically directed to overcoming the above enumerated problems in a novel and simple manner.

SUMMARY OF THE INVENTION

The invention comprehends conversion between left-hand and right-hand operation in a spin cast reel of the type having a housing with a reel body therein and a center shaft extending through the reel body and carrying a spinner head. According to the invention, a crank handle can be mounted selectively at either end of a crank shaft, which is operable to rotate the center shaft and in turn the spinner head. The axis of the center shaft may be slightly offset from the axis of the crank shaft or may intersect with the axis of the center shaft. In the case where the crank shaft and center shaft are offset, the center shaft extends beyond the axis of the crank shaft and is operatively engaged by a thumb button at the rear of the housing to shift the center shaft. Preferably the crank shaft has opposite, threaded ends to accept an operating crank handle so that conversion between left-hand and right-hand operation involves merely unthreading the crank handle from one side and replacing it on the opposite side of the reel.

It is also an objective of the invention to afford smooth drag and a drag transition through a mechanism that is operable selectively from either side of the housing depending upon which side the crank handle is mounted. To accomplish this end, the drag mechanism has a drag plate that bears upon a line-carrying spool rotatably associated with the reel body. Laterally spaced cam surfaces are formed integrally with the drag plate and are independently operated upon by separate actuators associated with posts. The posts extend through the housing, on opposite sides thereof, and are rotatably mounted therewithin. Rotation of either post, preferably accomplished through an externally manipulated drag star wheel, moves each actuator along its respective cam surface to either increase or decrease a drag braking pressure on the spool. The drag wheel is moved from one side to the other with the crank handle to effect conversion.

It is a further object of the invention to facilitate assembly of a crank shaft in a reel with selective right-hand and left-hand operating capability. A first boss is fixed to the reel body and has a bore to receive the crank shaft. A second boss is adjustable slidably relative to the reel body and can be separated therefrom. The second boss is positionable to align a bore therein with the bore on the first boss so that the bosses cooperatively support the crank shaft. The removable second boss permits access to a pinion gear on the center shaft for separation of the pinion gear and removal of the center shaft. This in turn facilitates placement and removal of the crank shaft with its associated gear mechanism that is in mesh with the pinion.

BRIEF DESCRIPTION OF THE DRAWINGS

FIG. 1 is an exploded, perspective view of a spin cast reel incorporating a preferred embodiment of the invention;

FIG. 2 is a partial, exploded, perspective view of the drag mechanism and a removable support boss for the crank shaft of the reel of FIG. 1;

FIG. 3 is a fragmentary, sectional view of the drag mechanism on one side of the reel in FIGS. 1 and 2.

DESCRIPTION OF THE PREFERRED EMBODIMENT

Figure 4:
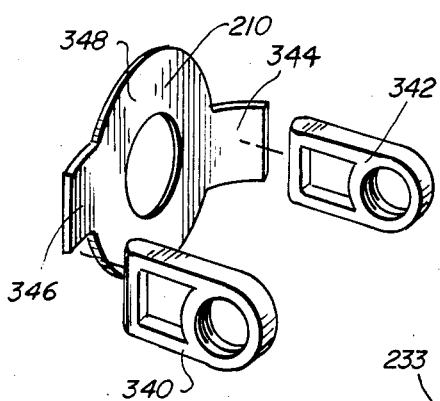
FIG. 4 is a perspective view showing the relative alignment between separate drag actuators and a drag plate associated with the drag mechanism of the reel of FIGS. 1 and 2.

FIGS. 1 and 2 depict a conventional spin cast style fishing reel at 10, to which the present invention is adaptable. The reel 10 comprises a two-part, front, cup-shaped cover 11 and a rear, cup-shaped cover 12 which captively surround a reel body 20 and encase the operating mechanism associated therewith. The reel body 20 has a deck plate 21 with a forwardly facing surface on an enlarged flange 23 which bears on a shoulder (not shown) defined by an annular undercut on the inside of the front cover 11. The rearwardly facing surface 24 of the flange 23 defines an offset collar 25 which seats in the mouth of the rear cover 12 as the forwardly directed edge 19 of the rear cover 12 abuts the surface 24 of the flange. The front cover 11 has an internal thread which threads on an external thread of the rear cover 12. The front and rear covers engage, one within the other, to establish connection and define a unitary reel structure. The front cover 11 has a knurled outer gripping portion 15 which facilitates grasping for effecting relative rotation between the front and rear covers. The reel is an above the rod type and is mountable to a fishing rod through a mounting foot 26 formed integrally with the rear cover 12.

Figure 5:
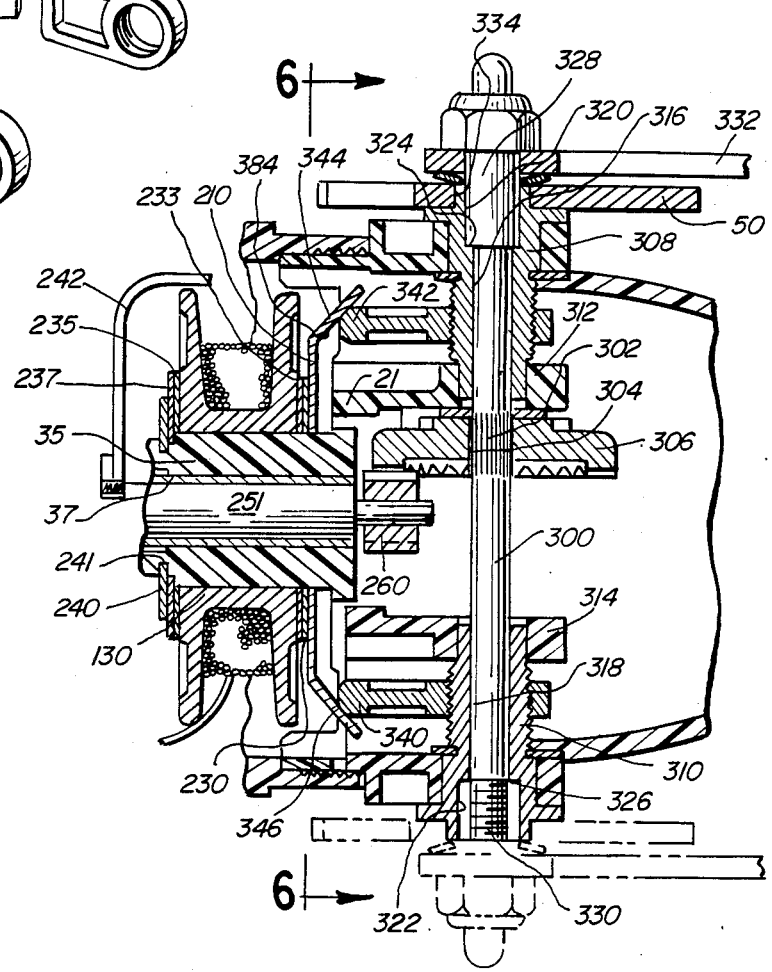
FIG. 5 is an overhead, fragmentary, sectional view of the structure for converting between left-hand and right-hand operation and a preferred drag mechanism according to the present invention.
Figure 6:
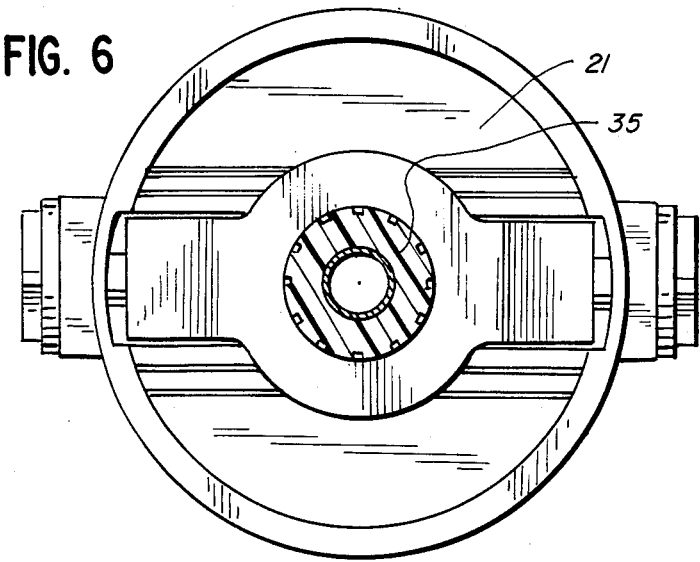
FIG. 6 is a sectional view of the reel along line 6—6 of FIG. 5.

The basic reel operation can be best described with reference to FIGS. 1, 2 and 5. The reel body 20 has an integrally formed central hub 35 extending from the deck plate 21 associated with the reel body 20. The hub 35 carries, in succession forwardly from the deck plate, a drag plate 210, back spool washer 230, back flat drag washer 233, line carrying spool assembly 130, front flat drag washer 235 and front spool washer 237, all of which are backed against retainer clip 240, resiliently bound in an annular slot 241 in the hub 35.

A center shaft 251 is journalled for rotation in a bore 37 directed centrally of and longitudinally through the hub 35. The forward region of the center shaft carries a spinner head assembly 242, which, through its associated mechanism (not shown), in a first mode, allows payout of fishing line and in a second mode, directs line onto the spool 130 upon rotation of the center shaft 251. A better understanding of the operation of the spinner head assembly 242 can be gained from a review of U.S. Pat. No. 4,408,729, to Moss et al, which depicts a like spinner head and describes the same in detail. Rotation of a crank handle 332 rotates the crank shaft 300, gear 306, pinion gear 260, centershaft 251 and spinner head 242 for winding line on the spool 130.

According to the invention, the crank shaft 300 extends laterally between the sides of the reel. The axis of the crank shaft 300 is shows intersecting the axis of the center shaft 251. It may be offset sufficiently above or below the axis of the center shaft 251 so as not to interfere with the center shaft 251 in those reels where the center shaft extends rearward of the crank shaft for actuation by a thumb button, not shown, on the rear of the reel such as shown in the Moss et al U.S. Pat. No. 4,408,729, mentioned above. The crank shaft 300 has lengthwise splines 302, intermediate its ends, which key the crank shaft in a bore 304 in a face gear 306. The face gear 306 is in mesh with the pinion gear 260 on the center shaft to transmit rotational movement of the crank shaft at right angles to the center shaft.

The crank shaft is supported adjacent its ends by posts 308, 310, carried rotatably within the housing in aligned bosses 312, 314, boss 312 being rigidly fixed on the deck plate on one side of the reel and boss 314 being removably carried by the deck plate on the other side of the reel. The fixed boss 312 has spaced apart legs 357, 359 defining a slot 361 therebetween. The slot 361 extends through the deck plate 21 in alignment with one end portion of the drag plate 210. The removable boss 314 likewise has spaced apart legs 358, 360 defining a slot 362 therebetween. The slot 362 aligns with a slot 362' in the deck plate when the boss 314 is in operative position. The removable nature of the boss 314 will be described in detail hereinafter. With the boss 314 in operative position, the slots 362 and 362' are aligned with each other and with the other end portion of the drag plate 210. The outer legs 357 and 358 of the bosses 312, 314, respectively, have enlarged bores 363, 364 while inner legs 359, 360 of the bosses have reduced diameter bores 365, 366. The posts 308, 310 each have a through bore 316, 318 conforming closely to the diameter of the crank shaft 300. Each post 308, 310 has a cylindrical body portion 350 divided into six parts, a square or other non-round attaching portion 336, a radial flange 352, a large diameter bearing portion 351, an undercut 380, a threaded portion 354 and a reduced diameter bearing or guide portion 356. The external diameter of the large bearing portion 351 and the reduced diameter portion 356 rotatably mate with the internal diameters of the enlarged bores 363, 364 and reduced diameter bores 365, 366 of the bosses 312, 314, respectively.

To assemble the crank shaft 300 and face gear 306 with the deck plate, the one end of the crank shaft is threaded through bore 365 in leg 359, through bore 376 in actuator 340 and bore 363 in leg 357 and face gear 306 is loosely meshed with the pinion gear 360 whereupon the post 308 is threaded on the end of the crankshaft and assembled with the fixed boss 312 by inserting the reduced diameter portion 356 through the bore 363 in the leg 357 into the threaded bore 376 in the actuator 340, which actuator is held in the opening 362 between the legs 357, 359 until the threaded portion 354 can be threaded into the threaded bore. When the post has been threaded into actuator 340 enough, the reduced diameter portion 356 is seated in bore 365 and large diameter portion 351 is seated in bore 363 and a C-shaped spring clip 378 is snapped into undercut 380 between the threaded portion 354 and the large diameter portion 351 against one face of leg 357. The clip 378 and flange 352 trap the post 308 in the boss 312 for rotation about its axis. The actuator 340 is trapped between the top and bottom walls of the slot 362 so that as the post rotates the actuator moves axially of the post. With the removable boss 314 assembled on the deck plate 21, the post 310 is assembled with the crank shaft, actuator 340 and boss 314 in substantially the same manner as post 308. Undercuts 320, 322 in the entrance portions of the posts 308, 310 provide a cylindrical spacing around the threaded end portion of the crank shaft 300 and define shoulders 324, 326 which seat a cylindrical guide 328, which is bolted to the crank handle 332. The guide 328 is threaded internally to mate with threaded ends 330 of the crank shaft 300.

A star wheel 50 has an aperture 334 that is substantially square or non-round and makes keyed connection with the correspondingly configured attaching portion 336 on each post 308, 310. The crank handle 332 is attached to the crank shaft by first situating the star wheel 50 over the desired end 336. A spring washer 338 is placed over the guide 328 on the handle which guide 328 is threaded onto the crank shaft. The direction of threads is such that the crank shaft tightens in the direction of line retrieve on the right side in FIG. 1, so that there is no tendency for the crank handle to separate during operation.

Conversion from the right-hand to left-hand mode is accomplished by first backing off the crank handle. This can be simply accomplished with a reel incorporating anti-reverse structure. The handle is replaced on the opposite side, to the left in FIG. 1, and threaded on the crank shaft in like fashion at the right end. On the left-hand side, the crank handle can be tightened by drawing the guide 328 against the locked crank shaft. The drag or star wheel 50 and spring washer 338 fit and are used interchangeably on each side of the reel.

Another aspect of the invention is a modification of the drag structure to accommodate conversion between left and right-hand operation of the reel. Drag braking pressure is applied to the line-carrying spool 130 by bearing forwardly upon the drag plate 210, which is guided by the hub 35 associated with the deck plate 21. The line-carrying spool is urged toward the retainer clip 240 so that friction increases between the line carrying spool and the washers 230, 233, 235, 237.

Forward urging of the drag plate 210 is accomplished by shifting drag actuator elements 340, 342 by translation along cam ramps 344, 346 which are offset out of the plane of the flat body 348 of the drag plate 210. The side edges of the cam ramps 344, 346 abut the top and bottom walls of the slots 362, 362' as the ramps extend into the slots 362, 362'. One drag actuator is associated with each boss 312, 314. The mounting of one actuator 340 with one boss 314 exemplifies the mounting of the other drag actuator which is the same on each side of the reel.

The post head 350 is freely rotatable within the bore 364 and is keyed to the star drag wheel 50. Upon rotation of the star drag wheel 50, relative rotation occurs between the post and actuator which translates the actuator 340 within the bounds of the slot 362. As this occurs, the nose 382 of the actuator traverses the inclined surface 384 of the cam ramp 344. Depending upon the direction of rotation, drag braking pressure is increased or decreased.

The provision of cam ramps 344, 346 on both sides of the reel facilitates drag adjustment from either the left-hand or right-hand side of the reel. The drag and drag transition is smooth, regardless from which side the reel is operated. In conversion between left and right-hand operation, the drag on the side not being used should be released to a no drag setting to avoid drag duplication and to allow a full range of adjustment between no drag and full drag on the operating side of the reel.

Another aspect of the invention is the provision of structure that facilitates removal of one boss 314 from the reel body 20 to permit assembly of the crank shaft 300 and face gear 306 without the use of tools or special fasteners. To accomplish this end, is seen in FIG. 2, parallel, laterally extending, elongate, vertically spaced guide members 386, 388 define guide slots 390, 392, respectively. The slots accept feet 394, 396 on the boss 314 guidingly in the lateral direction so that the boss 314 can be directed inwardly toward the center shaft over the face end of the crank shaft (already assembled with the boss 312). Removal of the boss 314, facilitates placement and removal of the crank shaft and the associated face gear 306.

The foregoing detailed description was made for purposes of demonstrating the structure and operation of the invention with no unnecessary limitations to be understood therefrom.

I claim:

1. In a spin cast style fishing reel of the type having a housing with opposite sides, a reel body within the housing supporting a line-carrying spool carried on a hub associated with the reel body and a center shaft extending axially through a portion of the reel body and carrying a spinner head operatively associated with the line-carrying spool, the improvment comprising:
   a crank handle;
   means for mounting the crank handle to the reel selectively at opposite sides of the housing;
   a drag plate mounted in the housing and bearing against the spool;
   first and second actuator means mounted in the housing, said drag plate having a pair of spaced cam surface aligned with the first and second actuator means;
   first and second posts mounted rotatably within the reel housing at opposite sides thereof;
   means for independently, selectively operating said first and second actuator means from opposite sides of the reel housing to apply pressure on said drag plate and on the spool; and
   means operatively connecting between the crank handle and the center shaft so that rotation of the crank handle from either side of the housing effects rotation of the center shaft, whereupon the fishing reel can be operated in either a left-hand or right-hand mode,
   said means for operating the first and second actuating means interconnecting the first and second posts with respective drag actuator means for movement of the drag actuators independently along either of the adjacent cam surface on the drag plate upon rotation of the posts, whereupon rotation of each of the posts in one direction bears the drag plate against the spool with increased drag braking pressure and rotation of each of the posts in the direction opposite the one direction reduces drag braking pressure of the drag plate on the spool.

2. The fishing reel of claim 1 wherein each said post has a fitting for making keyed connection to a star wheel, said star wheel facilitating selective rotation of each of the posts for drag adjustment.

3. In a spin cast style fishing reel of the type having a housing with opposite sides, a reel body within the housing having a deck plate with a flat surface facing rearwardly of the reel, a line carrying spool in the housing, a center shaft extending axially through a portion of the reel body carrying at its one end a spinner head in operative association with the spool, a pinion gear on the opposite end of the center shaft, a crank shaft having spaced ends and directed transversely with respect to the axis of the centershaft and a first boss fixedly associated with the reel body, continuously encircling the crank shaft and having a bore in which the crank shaft rotates, said first boss being spaced from the axis of the center shaft towards one side of the reel housing, the improvement comprising:
   a second boss having a bore extending therethrough;
   means for removably attaching the second boss to the reel body at a position spaced from the axis of the center shaft towards the side of the reel housing opposite the one side so that the bores in the first and second bosses are axially aligned with each other,
   said means for attaching the second boss comprising a pair of spaced, substantially parallel, elongate guide members on the reel body spaced from the flat deck plate surface and defining slots in conjunction with the flat deck plate surface and spaced guide feet on the second boss, said guide feet each having a flat surface and movable within the slots so that the second boss can be translated on the reel body between an operative position wherein the second boss supports the crank shaft and a disassembled position where the crank shaft can be readily removed from the reel, said flat surfaces of the guide feet facially abutting the flat surface of the deck plate with the second boss in its operative position, said crank shaft extending through the aligned bores and being supported by the first and second bosses; and means for attaching a crank handle selectively to either of the spaced ends of the crank shaft, whereupon the fishing reel can be operated in either a left-hand or right-hand mode.

4. In a spin cast style fishing reel of the type having a housing with opposite sides, a reel body within the housing, a line carrying spool in the housing, a center shaft extending axially through a portion of the reel body carrying at its one end a spinner head in operative association with the spool, a pinion gear on the opposite end of the center shaft, a crank shaft having spaced ends and directed transversely with respect to the axis of the center shaft and a first boss associated with the reel body and having spaced legs and a bore in which the crank shaft rotates, said first boss being spaced from the axis of the center shaft towards one side of the reel housing, the improvement comprising:

a second boss having a bore extending therethrough and spaced legs;

means for removably attaching the second boss to the reel body at a position spaced from the axis of the center shaft towards the side of the reel housing opposite the one side so that the bores in the first and second bosses are axially aligned with each other, said crank shaft extending through the aligned bores and being supported by the first and second bosses;

said means for removably ataching the second boss comprises a pair of spaced, substantially parallel, elongate guide members on the reel body and defining slots in conjunction therewith and spaced guide feet on the second boss and movable within the slots so that the second boss can be translated on the reel body between an operative position wherein the second boss supports the crank shaft and a disassembled position where the crank shaft can be readily removed from the reel;

means for attaching a crank handle selectively to either of the spaced ends of the crank shaft, whereupon the fishing reel can be operated in either a left-hand or right-hand mode;

a drag plate bearing against said spool having a pair of cam ramps thereon a drag actuator trapped against rotation between the spaced legs associated with each boss and each being in operative contact with one of said cam ramps; and means for moving said drag actuators along the axis of the crank shaft to increase or decrease the drag on said pool.

5. The fishing reel as claimed in claim 4 wherein said means for moving said drag actuators comprises a post rotatably mounted in each boss about one end portion of the crank shaft each said post having a threaded portion in threaded engagement with one of said actuators, a star drag wheel selectively keyed to one of said posts for actuating the actuator means associated with said post, said star drag wheel being held in position in said selected post by said crank handle being secured to the end of the crank shaft coinciding with said selected post.

* * * * *